INVENTOR.
HOWARD W. SIMPSON

Oct. 21, 1958     H. W. SIMPSON     2,856,794

PLANETARY TRANSMISSION FOR SELF-PROPELLED VEHICLE

Filed Dec. 13, 1955     6 Sheets-Sheet 2

INVENTOR.
HOWARD W. SIMPSON
BY
*Harley Forster & Harley*
ATTORNEYS

INVENTOR.
HOWARD W. SIMPSON
BY
ATTORNEYS

Oct. 21, 1958     H. W. SIMPSON     2,856,794
PLANETARY TRANSMISSION FOR SELF-PROPELLED VEHICLE
Filed Dec. 13, 1955     6 Sheets—Sheet 5

INVENTOR.
HOWARD W. SIMPSON.
BY Farley, Forster & Farley
attys.

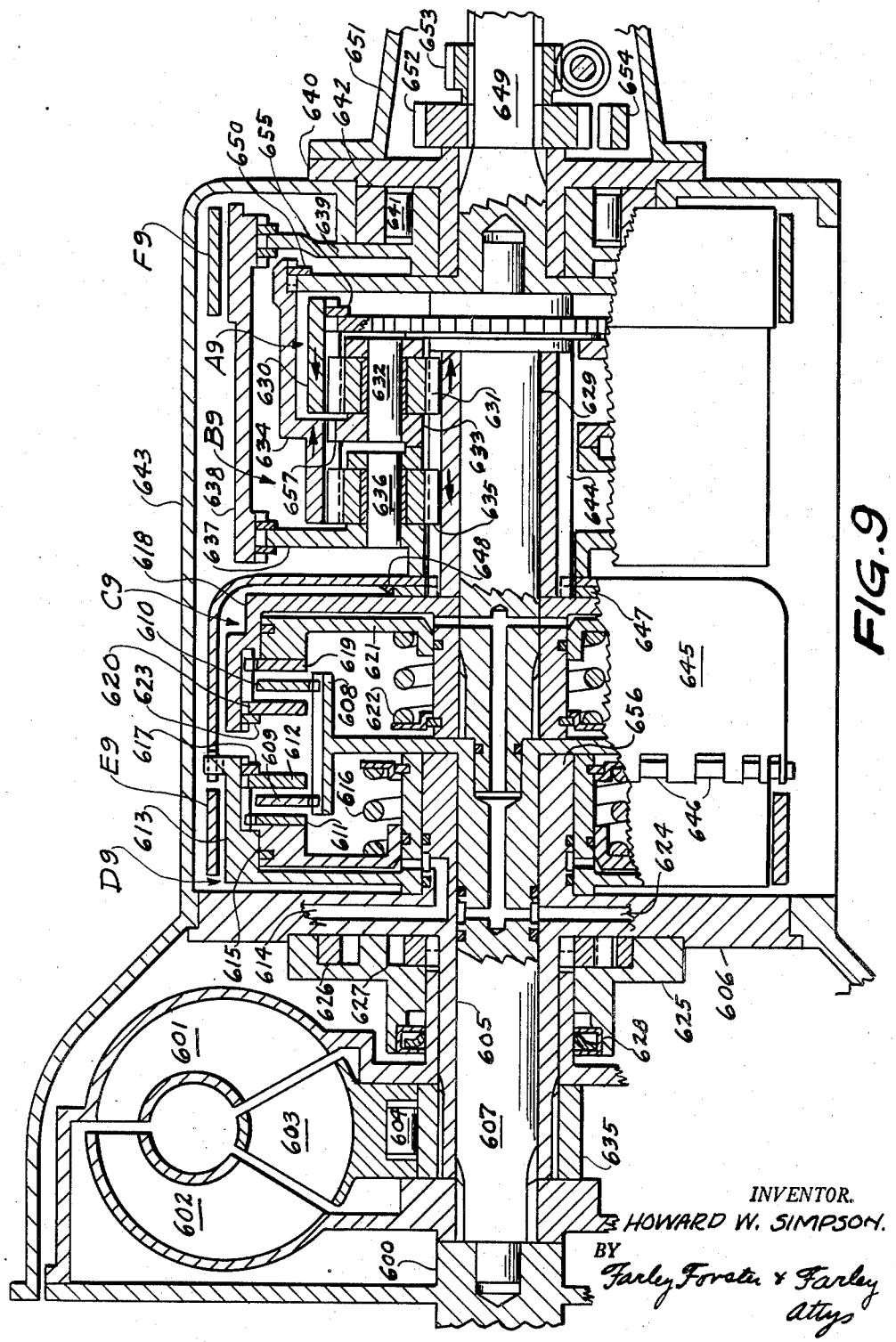

United States Patent Office 2,856,794
Patented Oct. 21, 1958

2,856,794

PLANETARY TRANSMISSION FOR
SELF-PROPELLED VEHICLE

Howard W. Simpson, Dearborn, Mich.

Application December 13, 1955, Serial No. 552,788

49 Claims. (Cl. 74—763)

The present application constitutes a continuation-in-part of my earlier filed copending applications, Serial No. 257,549, filed November 21, 1951, now abandoned, and Serial No. 402,317, filed January 5, 1954.

In the first of these applications, Serial No. 257,549, now abandoned, I disclosed for the first time a planetary transmission wherein a pair of simple planetary gear sets of the internal-external gear type are utilized in combination and under the control of two friction clutches and two brakes to provide three forward speed ratios, one reverse ratio, and a neutral condition. Three different embodiments of this basic improvement are shown in this early application, of which one specific embodiment has shown great commercial promise. This one form of transmission incorporates a free wheel or one-way brake unit to accommodate only unidirectional rotation of at least one transmission element, thus eliminating the necessity of power application or release of a holding mechanism for the one element and promoting a smooth power transition from one gear ratio to another.

In the second application, Serial No. 402,317, I disclosed an improved form of gear set similar to that of Serial No. 257,549, now abandoned. This second device minimizes frictional power losses within the gear set by balancing the thrust forces therein, so that there is never more than one thrust washer under active load in either of the two forward reduction ratios and no thrust washer under active load in direct drive.

This application includes a disclosure of the above described mechanisms, plus a disclosure of two new and improved embodiments of a transmission mechanism in which all of the above described advantages are obtained, together with certain other structural, functional, and cost reducing advantages.

One of the functional advantages of the mechanism of the present invention is in the provision of a free-wheeling or one-way brake unit effective to provide a one-way drive through the transmission only when the transmission is functioning in its lowest speed ratio. Thus, when the vehicle is coming to a stop, there is no jerk or appreciable change when the lowest speed ratio is rendered effective and there is no reversion torque drive from the wheels to the engine. A supplementary brake band is provided which can be applied, as by a manual shift to "low," if engine braking at low speed is desired or necessary, as upon descending an abrupt incline, or for an engine-augmented braking effect. Of course, when in a higher reduction speed ratio, when in direct ratio, or in reverse ratio, a two-way drive is obtained with full engine braking.

Several structural advantages are obtained by the present specific mechanism, including simplification of the gear case and other parts by the elimination of a center partition in the gear case, the driving of both clutches from a single splined drum, the support of both brake bands directly from the gear case, and the simplification and greater compactness of the gear train, per se.

It is, therefore, an important object of the present invention to provide a simple, efficient and compact planetary gear transmission.

Another object is to provide a method of connecting gear members by clutches whereby the relative speed of adjacent clutch friction elements and associated parts of both clutches is kept relatively low in all speeds and in neutral.

It is an additional object to provide a method of connecting gear members of a three speed and reverse planetary transmission by clutches so that the tooth engagement speed of idling gears is kept low in all speeds but especially in neutral and reverse in order to reduce friction and noise.

Yet another object is to provide a method of connecting gear members of a three speed and reverse planetary transmission so that the tooth engagement speed of the working gears in each speed is kept low to reduce friction and noise.

It is yet a further object of this invention to provide a method of connecting gear members by means of clutches whereby oil under pressure passes into rotating clutch hydraulic cylinders in a simple manner through the minimum number of relatively rotative parts.

An additional object of this invention is to provide a transmission with less power loss and greater mechanical efficiency by balancing out thrust loads by a unique combination of gearing in which there is never more than one thrust washer actively loaded in any forward speed reduction and none in direct drive.

A further object is to provide a simple and compact unit which is cheap to manufacture because of many parts such as gears, planets, bearing pins and clutch parts being alike.

Still another object is to provide gearing of great power capacity with light weight and long life, because subject to little wear.

It is another object to provide a transmission inherently more efficient in forward speeds than those presently available because of greater use of the principle of planetation in the gearing as adapted to produce the gear ratios required.

An additional object of the present invention is to provide a planetary gear set capable of providing a plurality of forward speed ratios and having mechanism providing a one-way drive through the transmission only when the transmission is functioning in its lowest forward speed ratio.

Another object of this invention is to provide such a transmission in which the one-way drive through the transmission can be rendered ineffective by the application of a supplementary brake, to obtain engine braking at low speed as desired.

It is a further object to provide a planetary gear set including a pair of spaced gearing units disposed in and supported by a gear case which does not have a central partition therein.

Still another object is the provision of a planetary gear set having a pair of clutches operable in connection therewith to establish different drive ratios in the gear set, both of the clutches being driven from a single driving element.

Yet another object is the provision of a planetary gear set in which frictional loss is reduced to a minimum by limiting the number of abutting surfaces which are subject to helical gear tooth end thrust loads by disposing the gear set actuating clutches in adjacent adjusted position and locating the reaction brakes so that the reaction loads are supported directly upon the gear casing or housing.

Other and further objects of the present invention will become apparent from a study of the drawings which are described in detail hereinafter and from the appended claims.

As shown on the drawings:

Fig. 9 is a longitudinal sectional view, with parts shown in elevation, illustrating yet another form of the present invention.

Figure 1:
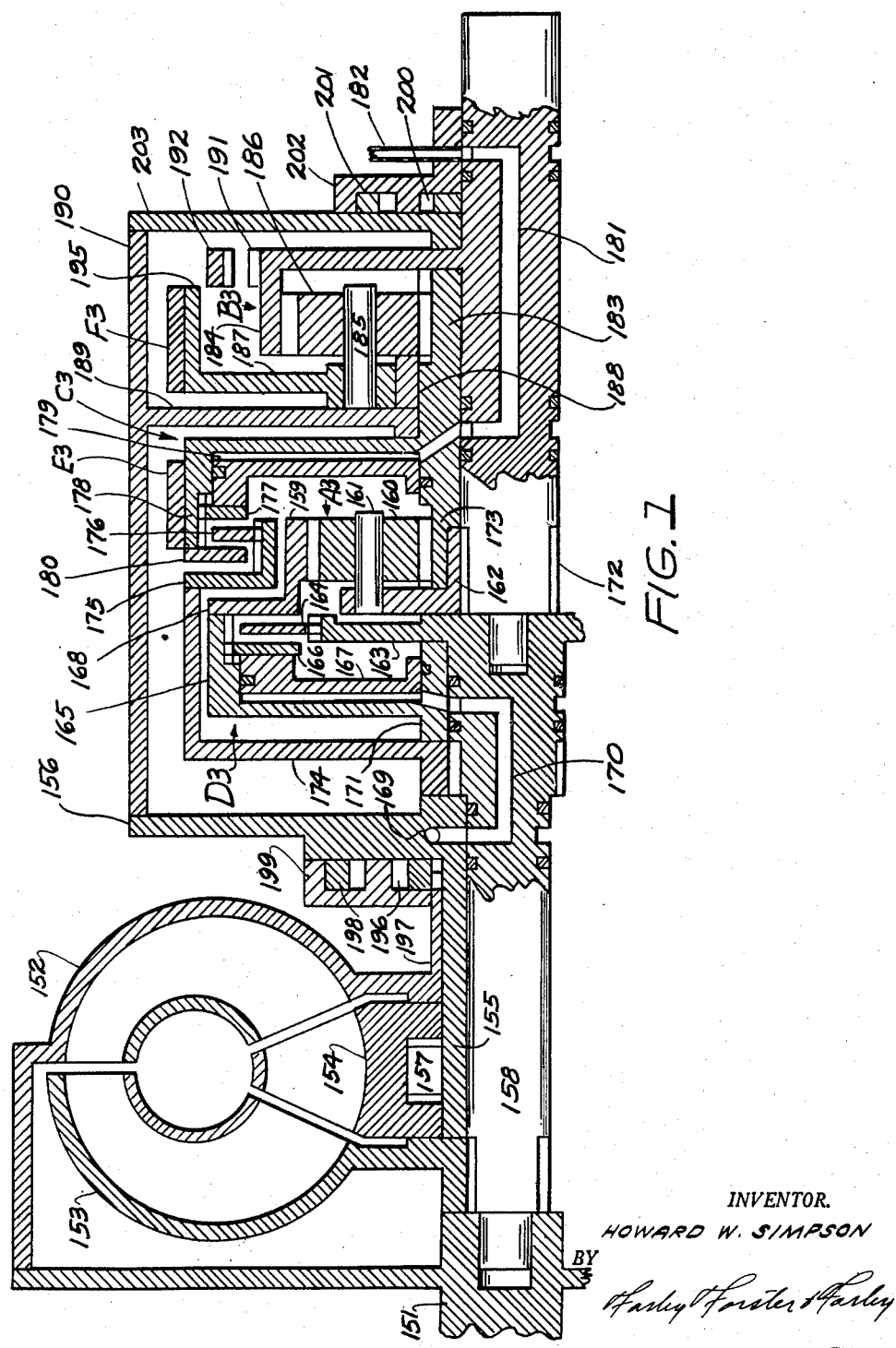
Fig. 1 is a simplified, partial elevational view, in section, illustrating one embodiment of my invention.
Figure 1A:
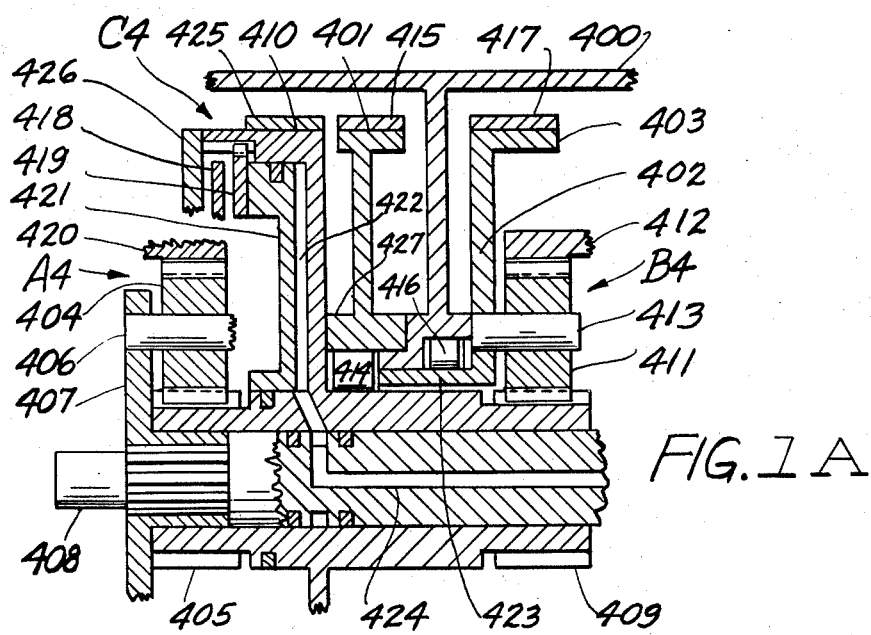
Fig. 1A is an enlarged, fragmentary, sectional view similar to Fig. 1 and illustrating an embodiment in which a pair of free wheel devices are utilized.
Figure 2:
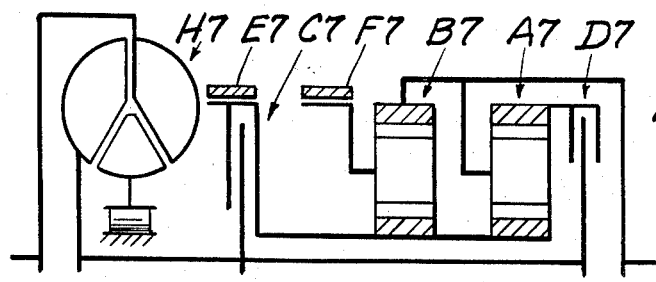
Fig. 2 is a schematic diagram illustrating the principal units of that embodiment of the invention illustrated in Fig. 1, and in which certain of these units are transposed to optional positions.

That form of the invention illustrated in Figs. 1, 1A, and 2 has been first disclosed in my pending application, Serial No. 257,549, now abandoned, filed November 21, 1951, and hereinbefore referred to. That form of the invention illustrated in Figs 3, 4, 5, 6, and 7 was originally disclosed in my application, Serial No. 402,317, as hereinbefore explained. Those forms of the invention illustrated in Figs. 8 and 9 are herein disclosed for the first time and constitutes improvements upon and additions to the other forms of the invention, the latter two forms perfecting the advantages hereinbefore discussed and possessing considerable commercial merit because of these advantages.

Each form of the invention will be described in detail separately, with a brief discussion of the operation of each specific form being appended thereto.

*The embodiment of the invention illustrated in Figs. 1, 1A, and 2*

In the embodiment of Fig. 1, the engine shaft 151 drives the pump 152 of a torque convertor which, when the convertor is filled, transmits torque to the output or turbine element 153. The stator 154 is the reaction member of the convertor and is mounted for rotation on a stationary hub 155 which is integral with housing flange 156, the stator 154 being held against backward rotation by a free wheel or one-way clutch unit 157. The turbine 153 is splined to a transmission input shaft 158 which is integral with a ring gear 159 of gear set A3. The ring gear 159 meshes with several planet gears 160, each of which is mounted upon a pinion shaft 161 carried by a planet carrier 162.

Clutch D3 comprises a housing 165 retaining a sliding friction disc 166 and having a pressure plate 168 attached to the housing 165. The sliding friction disc 166 is splined to the drum or housing 165 and is actuated by a fluid pressure actuated piston 167. While pressure entering through casing line 169, and shaft passage 170 will move the piston 167 to engage the disc 166 with the sliding disc 164, moving the disc 164 against the pressure plate 168 which is fixed to the ring gear 159. The ring gear 159 is thus connected to the input shaft 158 to the clutch D3. The first planet carrier 162 is splined to an output shaft 172 and the several planet gears 160 carried by the carrier 162 mesh with the ring gear 159 and with a sun gear 173 which is journaled on the output shaft 172 for relative rotation.

A second clutch C3 comprises a clutch driving member 174 splined to and driven by the input shaft 158 and having a flange 175 which drives a sliding clutch disc 176. The clutch C3 includes the clutch discs 176 and 177, a clutch housing 178, a clutch piston 179, and a pressure plate 180 which is fixed to the clutch housing 178. Oil under pressure, entering passage 181 through a supply tube 182, when moved by the piston 179 and the clutch discs 176 and 177 against the pressure plate 180 to connect the integral sun gears 173 and 183 to the input shaft 158.

The second gear set B3 includes a ring gear 184 which is integral with the output shaft 172, the above identified sun gear 183, and several planets 186, which are journaled on shaft 185 fixed in carrier 187. The carrier 187 is supported on the hub 188 of a housing flange 189 which is integral with the main housing 190. The ring gear 184 has teeth 191 on its outer periphery which are engageable with a parking lock detent 192 which is attached to the housing 190. A brake drum E3 is engageable with the periphery of the clutch housing 178 to act as a brake drum, and when the band E3 is engaged, it holds both sun gears stationary. A second brake band F3 is engageable with a drum 195 which is integral with a planet carrier 187.

Pressure fluid is provided by pump including a pump gear 196 driven from the engine shaft 151 through the convertor pump 152, the hub 197 of the gear 196 being notched to fit mating notches in the pump gear 196. An internal pump gear 198 meshes with the pump gear 196 and both gears are supported in a pump housing 199. An output shaft pump is provided by gears 200 and 201 which are mounted in a pump housing 202, the pump gear 200 being driven by the output shaft 172 by suitable means, as by a key (not shown). Housing flange 203 attached to the main housing 190 supports the output shaft 172.

In the embodiment of Fig. 1 in neutral both clutches and brakes are released. Ring gear 159 and clutch D3 to which it is attached, float between input and output shafts 158 and 172. Likewise sun gears 173 and 183 and C3 to which the are attached float between the input and output shafts 158 and 172.

All the gears tend to remain stationary when the vehicle is stationary even though the input shaft is rotating, because the drag of clutch D3 tending to turn ring gear 159 forward is opposed by the drag of clutch C3 tending to turn sun gear 173 forward. With the gears stationary, the relative speed of adjacent clutch discs in both clutches is equal to the speed of input shaft 158. But if frictional drag in clutch D3 is more than that in clutch C3, ring gear 159 will rotate forward and thus will rotate the sun gears and clutch housing 178 backward at a speed which is about twice that of ring gear 159. In this case the relative speed of the adjacent clutch discs in clutch D3 is reduced but the relative speed of adjacent clutch discs in clutch C3 is increased.

In low clutch D3 and brake band F3 are engaged and carrier 187 becomes the reaction member. This forces sun gears 173 and 183 to turn backward and carrier 162 and ring gear 184 forward. This is a differential drive with power transmitted partly through gear set A3 and partly through both sets A3 and B3.

In second clutch D3 remains engaged but brake band F3 is released and brake band E3 engaged. This holds sun gears 173 and 183 stationary, 173 being the reaction member while carrier 162 is rotated forward at a speed intermediate to low and high speeds. Gear set B3 idles freely in second speed.

In high, both clutches C3 and B3 are engaged and both brakes E3 and F3 released which locks up the gears to rotate as a single unit without gear reduction. In reverse clutch C3 and brake band F3 are engaged and sun gear 183 becomes the driving member, carrier 187 the reaction member, and ring 184 the output member. Ring gear 159 is thus driven backward at a speed which is approximately equal to that of input shaft 158 and since the forward speed of the driving clutch disc 164 is equal to input shaft speed the relative speed of adjacent clutch discs 164 and 166 is approximately twice input shaft speed.

In Fig. 1A, housing 400 is shown supporting brake drum 401 and carrier 402 which is integral with brake drum 403. Several planet gears 404, one of which is shown journaled on shaft 406, mesh with sun gear 405 and ring gear 420. Shaft 406 is fixed in carrier 407 which is splined to shaft 408. Sun gear 405 is integral with sun gear 409 and brake drum 410. Several planet gears 411, one of which is shown journaled on shaft 413, mesh with sun gear 409 and ring gear 412. Shaft 413 is fixed in carrier 402. Free wheel unit 414 is placed between the hub 427 of brake drum 401 and sun gears 405 and 409. Free wheel unit 414 comprises sprag elements or the like, which are biased to permit only forward rotation of sun gears 405 and 406 when brake drum 401 is held stationary by brake band 415.

Free wheel unit 416 is placed between the housing 400 and the hub 423 of carrier 402 and also has sprag elements or the like which are biased to permit only forward rotation of carrier 402 when brake band 417 is released.

Brake drum 410 is also a clutch housing supporting clutch plates 418 and 419 which are engaged against pressure plate 426 by means of piston 421 when the latter is energized by oil pressure reaching cylindrical space 422 in clutch housing through oil passage 424.

A third brake band 425 is applied to the periphery of clutch housing 410 (which also serves as a brake drum) for holding sun gears 405 and 409 stationary with respect to housing 400 positively without free wheeling in the second speed ratio.

The structure shown in Fig. 1A is similar to that shown in Fig. 1, but, by adding two free wheel units, control mechanism and valves which would be required to obtain timed overlap in both up and down shifts in forward speed ratios are eliminated. With the two free wheel units as shown in Fig. 1A, engine runaway is prevented during a change or shift from one forward speed ratio to another even though the power input to the transmission is continuous during the various forward speed ratio changes. For instance, in low speed, free wheel unit 416 holds carrier 402 as a reaction member against backward rotation as well as brake 417 but, if brake 417 is released, the free wheel unit 416 continues to hold the carrier stationary. While in low speed both sun gears 405 and 409 are rotating backward. But if the control mechanism shifts the transmission into intermediate or second speed, brake band 415 is applied which stops the backward rotation of sun gears 405 and 409 through the locking action of free wheel unit 414. Then sun gear 405 becomes the reaction member and carrier 402 begins to turn forward and is instantly released from housing 400 by free wheel unit 416 overrunning.

When shifting from second speed to direct drive, clutch C4 (also C in Fig. 1) is engaged which locks all the gears in direct drive and forces the sun gears 405 and 409 to rotate forward. Free wheel unit 414 then instantly releases the sun gears from brake drum 401 because the free wheel unit then overruns also.

Brake band 415 remains applied and holds drum 401 stationary in direct drive so as to have free wheel unit 414 ready to prevent appreciable backward rotation of sun gears 405 and 409 if a down shift from direct to second speed is made by releasing clutch C4. When this is done, the slightest backward rotation of the sun gears 405 and 409 is sufficient for the free wheel unit 414 to again lock them to the then stationary brake drum 401. This causes sun gear 405 to again be a reaction member and the transmission is then in second speed. If, however, clutch C4 and brake band 415 are both released while clutch D4 remains engaged as before, the transmission is in low speed ratio because free wheel unit 414 is then not effective in holding the sun gears stationary but merely turns the brake drum 401 backward with sun gears 405 and 409.

Since this backward rotation of the sun gears also tends to turn carrier 402 backward, free wheel unit 416 again comes into action and holds carrier 402 stationary as a reaction member for low speed. Brake band 417 is not necessary to obtain low speed but is necessary for reverse drive and also to prevent the vehicle from free wheeling when coasting in low speed. If it is desired to prevent free wheeling in second speed, the third brake band 425 is applied to drum 410 in second speed only to prevent the sun gears from overrunning when the vehicle is coasting.

A manual control for the present disclosure preferably includes a "drive and low" position and a start from a standstill in drive would begin in second gear while a start in low would begin in low gear. However, if the vehicle begins to roll backward on a grade while the engine is idling with the manual control in either drive or low, low speed is the gear ratio which operates in either case and causes the convertor turbine to rotate backward at the speed of the transmission output shaft times the low speed gear ratio. Thus, free wheel unit 416 by engaging low speed ratio whether the controls are conditioned for low or second automatically provides considerable retarding effect for undesirable backward movement.

In that embodiment of the invention illustrated in Fig. 2, the gear sets A and B have been transposed. In other words, the gear set designated as A3 in Fig. 1 is the equivalent of the gear set denoted as A7 in Fig. 2, similarly, the gear set denoted as B7 in Fig. 2 is the same as the gear set denoted as B3 in Fig. 1. From a comparison of the two figures it will be seen that the relative position of the gear set, with respect to the torque convertor have merely been reversed, and the arrangement of the band E7 and F7 and the clutches C7 and B7 have similarly been reversed.

Accordingly, the transmission of Fig. 2 operates in the same manner as the transmission of Fig. 1, with the exception of the transposition of the gear sets and the actuating members cooperative therewith.

The following is a chart showing the various brake bands and clutches which are applied and engaged to obtain in the different speed ratios in Figs. 1 and 2 of the present invention.

|      | Fig. 1       | Fig. 2   |
| ---- | ------------ | -------- |
| Low  | F3<br>D3     | F7<br>D7 |
| 2nd  | E3<br>D3     | E7<br>D7 |
| High | C3<br>D3     | C7<br>D7 |
| Rev  | F3<br>C3     | F7<br>C7 |

*The embodiment of Figs. 3–7, inclusive*

Figure 7:
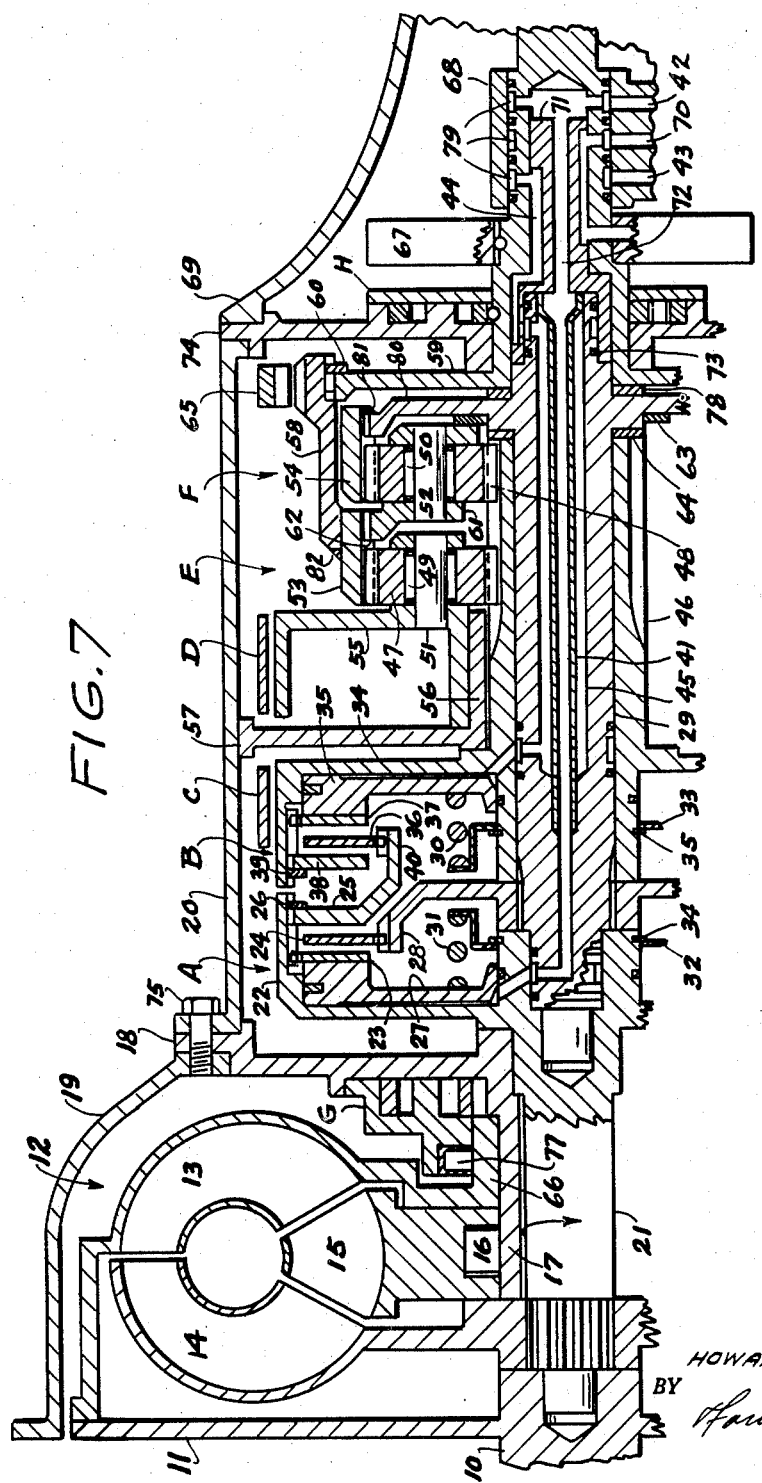
Fig. 7 is an enlarged, simplified, partial longitudinal elevation, in section, of the transmission embodying the operations illustrated diagrammatically in Figs. 3, 4, 5, and 6.
Figure 8:
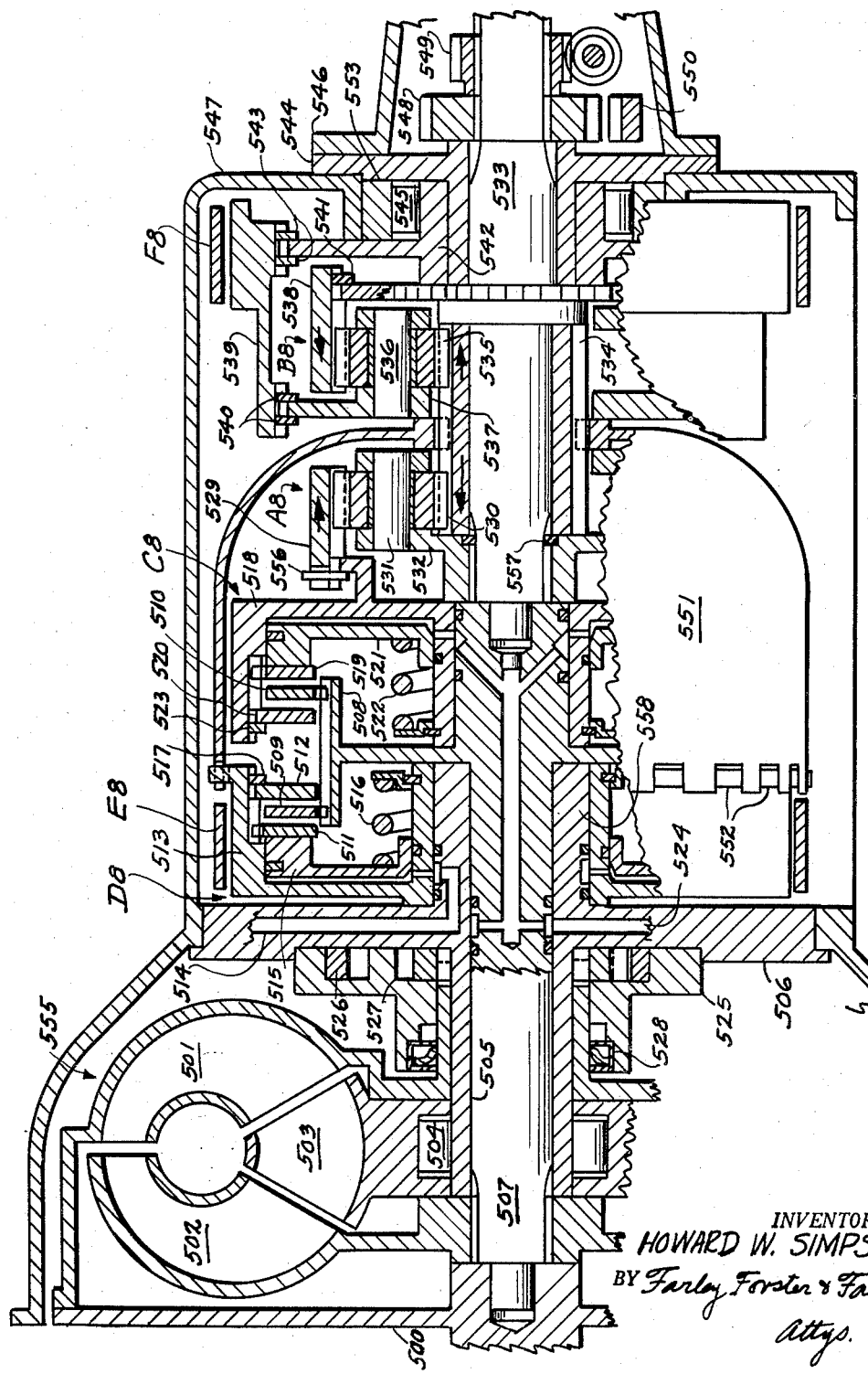
Fig. 8 is an enlarged longitudinal sectional view, with parts shown in elevation, of an additional form of the invention.

In Fig. 7 engine shaft 10 has flywheel 11 which drives convertor 12. This consists of pump 13, turbine 14 and stator 15, which is prevented from turning backward by one-way clutch 16 mounted on hub 17 of plate 18. Housing 19 encloses the convertor and housing 20, the transmission. Turbine 14 is splined to input shaft 21 which is integral with clutch housing 22, and turns in plate 18.

Clutch A consists of housing 22, clutch plates 23 and 24 which are splined to permit end movement, pressure plate 25 splined to housing 22 and held in place by snap ring 26, and piston 27. Plate 24 drives clutch hub 28 which is splined to shaft 29.

Clutch B consists of housing 34 integral with sun gear 46, piston 35, clutch plates 36 and 37 and pressure plate 38 held in place by snap ring 39. Clutch plate 36 is splined to and driven by hub 40 of pressure plate 25 and clutch plate 37 is splined to and drives housing 34. Hydraulic pressure operates clutch A through tube 41 and passage 42 forcing piston 27 to compress spring 31 and push clutch plates 23 and 24 against pressure plate 25. Pressure through passage 43 passes to clutch B through passages 44 and 45 forcing piston 35 to compress spring 30 and engage clutch plates 36 and 37 against pressure plate 38. Springs 30 and 31 are held by retainers 32 and 33 and snap rings 34 and 35.

Sun gear 46 rotates freely on shaft 29 and meshes with planet gears 47 and 48. These planet gears are mounted on bearings 49 and 50 on pins 51 and 52 and mesh with ring gears 53 and 54. Pin 51 is pressed into carrier 55 mounted on hub 56 of support plate 57 which is fixed in housing 20. Brake band C is engageable to hold clutch housing 34 and sun gear 46 against rotation. Brake band D is engageable to hold carrier 55 against rotation.

Ring gear 53 is welded at 82 to parking lock gear 58 which in turn is splined to output shaft 59 and retained by lock ring 60. Carriers 55 and 61 are slotted to receive planets 47 and 48 respectively. Carrier 61 of gear set F has pin 52 pressed into both of its flanges to hold planet gear 48 and is splined to ring gear 53 which has a shoulder 62 for transmitting end thrust to carrier 61 and the latter transmits this thrust through washer 63 to flange 80 of shaft 29 which is welded to ring gear 54 at 81. A third washer 78 is placed between flange 80 and output shaft 59. Detent 65 is engageable with parking lock gear 58 to hold the vehicle on a grade. End thrust of sun gear 46 is balanced against that of ring gear 54 through thrust bearing 64.

Primary pump G is mounted on plate 18 and is driven by hub 66 of convertor pump 13. Secondary oil pump H in plate 74 and is driven by output shaft 59, which also drives governor 67 and turns in the hub of plate 74. Sleeve 68, attached to extension housing 69, contains oil passage 70 to governor 67 and passages 42 and 43. Grooves 79 in shaft 59 facilitate entry of oil under pressure. Stepped bushing 71 has a central passage 72 which feeds clutch A and external passage 44 which feeds clutch B. The end of shaft 29 turns freely in the recessed end of stepped bushing 71 and has seal rings 73.

Extension housing 69 is attached to housing 20 thereby holding plate 74 securely in the same way that plate 18 is held between housings 19 and 20 by screws one of which, 75, is shown. Seal 77 prevents oil leakage from pump G.

To make the drawing clear, few clutch plates are shown although more can be used in each clutch if desired. Also numerous washers, bushings and screws are omitted for greater clarity. Sun gear 46 has right hand helical teeth and both ring gears and the planet gears have teeth with left hand helices. Although only one planet gear is shown per gear set, three per set are used.

In Figs. 3, 4, 5, and 6 clutches A and B, brake bands C and D and gear sets E and F are shown in further simplified form with parts not loaded shown in dotted lines. The arrows on the various members show the torque path. Also arrows above and below the ring and sun gears respectively show the direction of the end thrust when the gears are working. Only the thrust washers which are under load are shown in Figs. 3, 4, 5, and 6.

Figure 3:
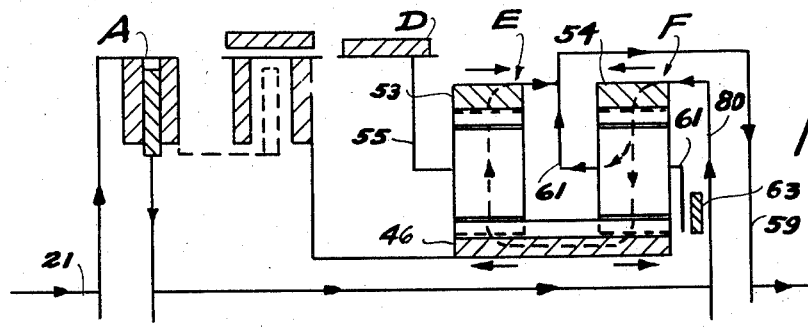
Fig. 3 is a diagrammatic, partial longitudinal elevation, in section, illustrating the operation of a modified form of transmission of the present invention in low speed ratio.

In Fig. 3, washer 63 is shown in section between carrier 61 and flange 80.

Figure 4:
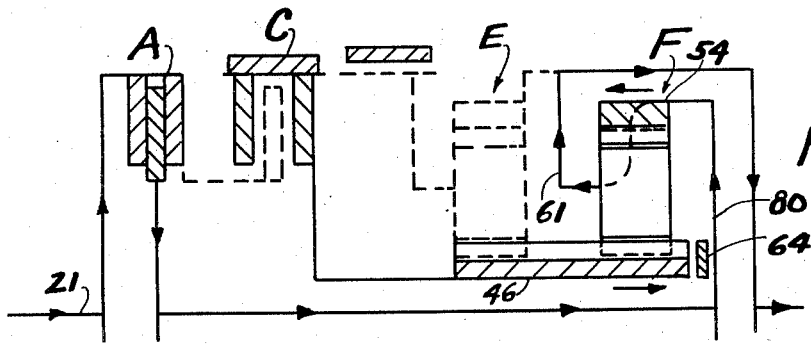
Fig. 4 is a view similar to Fig. 3 illustrating the transmission in second speed ratio.
Figure 5:
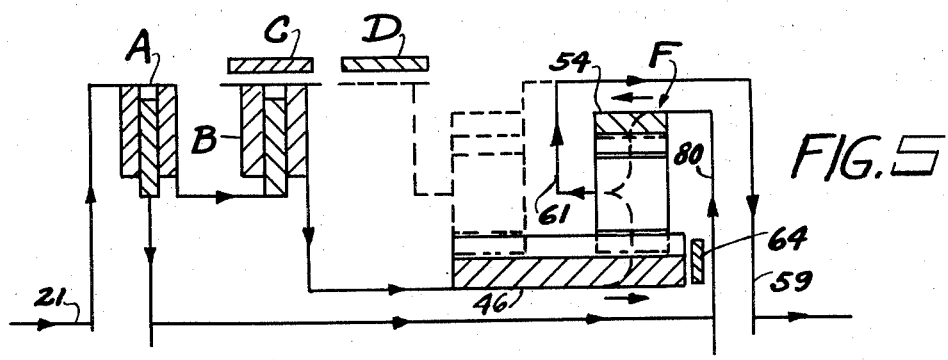
Fig. 5 is a view similar to Figs. 3 and 4 illustrating the transmission in third speed ratio or direct drive.

In Figs. 4 and 5, washer 64 is shown between sun gear 46 and flange 80.

Figure 6:
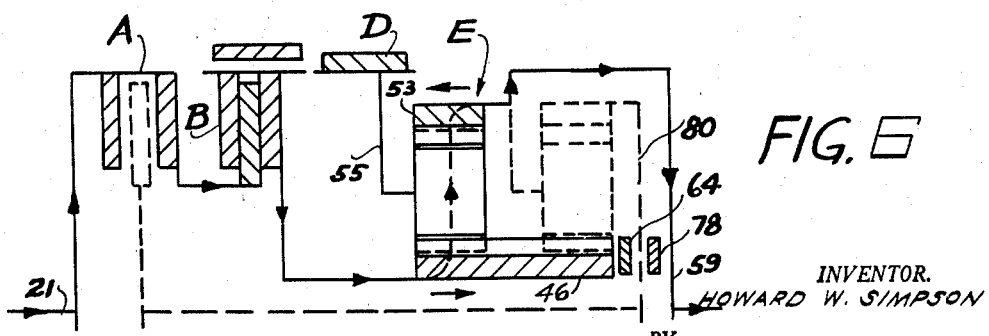
Fig. 6 is a view similar to Figs. 3, 4 and 5 illustrating the transmission in reverse speed ratio.

In Fig. 6, washer 64 is shown between sun gear 46 and flange 80 and washer 78 between flange 80 and output shaft 59.

In low speed, as in Fig. 3, clutch A and brake D are engaged. This directs the input torque to ring gear 54 of gear set F and the multiplied torque of carrier 61 is transmitted directly to output shaft 59. Sun gear 46 turns backward and since the carrier 55 is held by brake D, ring gear 53 turns forward and its torque is added to that of carrier 61. Since the end thrust of ring gears 53 and 54 are equal and opposite, washer 63 is the only member subjected to active or rubbing thrust load, and therefore there are no residual loads to be transmitted to other rubbing surfaces.

In second speed, as in Fig. 4, clutch A remains engaged and brake D is released and brake C applied. The input is to ring gear 54 and the output from carrier 61 as in low speed. Sun gear 46 is held by brake C and so there is no output torque from gear set E. Since the end thrust of sun gear 46 and ring gear 54 are equal and opposite, washer 64 is the only member subjected to active thrust load.

In third or direct drive, as in Fig. 5, both clutches A and B are engaged and both brakes C and D released. Clutch A transmits part of the input torque from shaft 21 to ring gear 54 and clutch B transmits the remainder to sun gear 46. This locks up gear set F so that carrier 61 and output shaft 59 turn at input speed. The thrusts are balanced through washer 64 as in second speed but since all the parts are rotating together there is no rubbing or friction due to thrust.

In reverse, as in Fig. 6, clutch A is released and clutch B engaged, which directs the input torque to sun gear 46. Brake D holds carrier 55, thus driving ring gear 53 and output shaft 59 backward. The thrusts of ring gear 53 and sun gear 46 are balanced through washers 64 and 78 with flange 80 between them.

Referring to Fig. 7, input shaft 21 turns clockwise when viewed from the front or convertor end as shown by the arrow. When ring gear 54 turns forward as a driving gear in low speed, its left hand helical teeth cause it to be urged forward toward the convertor. At the same time, ring gear 53, which also has left hand helical teeth but is a driven gear, thrusts backward or away from the convertor. This backward thrust is transmitted by shoulder 62 through carrier 61 to washer 63, thus balancing the forward thrust of ring gear 54.

In second and third speed, the forward thrust of ring gear 54 is balanced by the backward thrust of sun gear 46 through washer 64. Thus in all forward speeds only one thrust washer is needed. In reverse, the thrust of sun gear 46 is backward and that of ring gear 53 is forward so that both washers 64 and 78 are loaded. Due to the complete balancing out of thrust loads in all forward and reverse speeds within the rotating members, there is no thrust load imposed on the hubs of plates 18 or 74, except when the vehicle is coasting. Then the thrust loads are reversed in direction and more than one thrust surface is loaded in second, high and reverse, but since this condition is usually of short duration and not at as high torque, the friction developed is of no consequence. In low speed however, only one thrust washer, 78, is loaded when coasting.

The embodiment of Fig. 8

Referring to Fig. 8, engine shaft 500 drives convertor pump 501 when the convertor 555 is filled with fluid, thus transmitting torque to turbine 502. Stator 503 is mounted for rotation on stationary hub 505 of gear case flange 506 and is held against backward rotation by free wheeler 504. Turbine 502 is splined to shaft 507 having integral drum 508, which drives sliding discs 509 and 510 of clutches D8 and C8. Other members of clutch D8 are sliding disc 511 and pressure plate 512 both of which are splined to housing 513 which is rotatably mounted on hub 558 of flange 506.

Oil pressure through passage 514 moves piston 515 to compress retracting spring 516 and force discs 509 and 511 against pressure plate 512, which is held in place by snap ring 517.

Band E8 is adapted to hold housing 513 and sun gear 534 stationary by means of a hydraulic servo (not shown).

Clutch C8 includes housing 518, sliding discs 510 and 519, pressure plate 520, piston 521, retracting spring 522, and retaining snap ring 523 and is engaged by oil pressure entering through passage 524. Oil pressure is supplied by pump 525 comprising internal gear 526, external gear 527 and oil seal 528.

Input gear 529 of gear set A8 is splined to clutch housing 518 and meshes with 3 planet gears 530, each of which is rotatably mounted on a pin 531 supported in carrier 532, the carrier being splined to output shaft 533. Input gear 529 is retained by snap ring 556.

Sun gear 534 is rotatably supported on shaft 533 and meshes with planet gears 530 and 535. Gear set B8 consists of sun gear 534, planet gears 535 which rotate on pins 536 mounted in carrier 537, and ring gear 538.

Carrier 537 is splined to brake drum 539 and retained by snap rings 540. Band F8 is adapted to hold brake drum 539 and carrier 537 against rotation and is actuated by a hydraulic servo unit (not shown). Ring gear 538 is splined to output shaft 533 and retained by snap ring 541. Hub 542 is splined to brake drum 539, retained by snap rings 543, and turns on the hub of flange 544. Free wheeler 545 is located between hub 542 and ring 553 which is fixed in housing 547 and is biased to permit forward rotation of hub 542 and drum 539 but locks them against backward rotation. Flange 544 and cap 546 are fastened to the main housing 547 by suitable means, as by screws (not shown).

Parking gear 548 and rear pump and governor drive gear 549 are splined to output shaft 533, and detent 550 is adapted to engage the parking gear 548 to hold the vehicle stationary.

Drum 551 is notched at one end to engage teeth 552 on housing 513 and at the other end is internally splined to mesh with sun gear 534, thus connecting sun gear 534 to turbine 502 when clutch D8 is engaged.

In Fig. 8, sun gear 534 has left hand helical gear teeth and input gear 529 and ring gear 538 have right hand helical teeth. The arrows on these gears show the direction of end thrust forces in low speed. In second speed only gear set A8 is working and the same arrows apply to this gear set but there are no thrust forces in gear set D8.

The thrust forces in sun gear 534 balance each other in low because they are opposite in direction, the front end being driven and the rear end driving. Likewise, the end thrust forces of input gear 529 and ring gear 538 are equal and opposite in low gear because input gear 529 is driving and ring gear 538 is driven. The thrust of the latter balances that of input gear 529 through snap ring 541, output shaft 533, snap ring 557, carrier 532, housing 518 and snap ring 556. Thus there is relative rotation under end thrust load, in low gear, only between carrier 532 and housing 518.

In second speed, there is also relative rotation under thrust load between sun gear 534 and carrier 532. In reverse speed there are thrust loads between several relatively rotating parts but this is of no importance because reverse is used infrequently and then only momentarily.

Convertor 555 is of conventional design and delivers varying multiplied torque to shaft 507 when starting the vehicle. In neutral both clutches and brakes are released so that only idling torque can be delivered to shaft 507. Clutch C8 is engaged in all forward speeds which transmits torque to input gear 529.

In low speed, free wheeler 545 holds carrier 537 only against backward rotation, thus causing sun gear 534 to turn backward and at the same time drive carrier 532, shaft 533 and ring gear 538 forward slowly. Band F8 may be engaged under manual controls (not shown) to lock carrier 537 against rotation in either direction, thus preventing overrun of carrier 537 when coasting and to provide for engine braking. Also, the band F8 is engaged in reverse to lock the carrier against forward movement. In the forward speeds, the band F8 thus serves as a supplementary brake for carrier 537 which need not be applied for normal forward driving operations and which is utilized only when a manual shift to "low" range is made and a two-way drive is required.

In second speed band F8, if applied, is released and band E8 is engaged which holds sun gear 534 stationary thus driving carrier 532 forward at a faster speed than in low. Clutch C8 remains engaged. As soon as sun gear 534 stops, carrier 537 starts to turn forward slowly and free wheeler 545 then overruns thus permitting carrier 537 to rotate forwardly. The only band and clutch change necessary for a shift to second speed is the application of band E8.

High speed is a direct drive with the gears locked up to turn as a unit by engaging both clutches C8 and D8.

In reverse clutch D8 and band F8 are engaged and sun gear 534 becomes the input member. Since carrier 537 is now stationary, ring gear 538 and output shaft 533 turn backward.

*The embodiment of Fig. 9*

In Fig. 9, shaft 600 drives convertor pumps 601 which transmits torque to turbine 602. Stator 603 is mounted for forward rotation on sleeve 635 which is splined to stationary hub 605 of flange 606. Stator 603 is held against backward rotation by free wheeler 604. Turbine 602 is splined to shaft 607 which has an integral drum, 608, which drives sliding discs 609 and 610 of clutches D9 and C9. Other members of clutch D9 are sliding disc 611 and pressure plate 612, both of which are splined to housing 613 which is rotatably mounted on hub 656 of flange 606. Oil pressure through passage 614 moves piston 615 to compress retracting spring 616 and force discs 609 and 611 against pressure plate 612 which is held in place by snap ring 617.

Band E9 is adapted to hold housing 613 and sun gear 644 stationary by means of a hydraulic servo (not shown).

Clutch C9 includes housing 618, sliding discs 610 and 619, pressure plate 620, piston 621, retracting spring 622 and retaining snap ring 623 and is engaged by oil pressure through passage 624. Pressure is supplied by pump 625 comprising internal gear 626, external gear 627 and oil seal 628.

Clutch housing 618 is splined to intermediate shaft 629 which in turn is splined to input gear 630 of gear set A9. Input gear 630 meshes with 3 planet gears, one of which, 631, is shown rotatably mounted on pin 632 fixed in carrier 633. The latter is splined at its outer diameter to ring gear 634 of gear set B9. Other members of gear set B9 are sun gear 644 which is common to both gear sets and planet gears 635, one of which is shown rotatably mounted on pin 636 which is fixed in carrier 637, which is splined to brake drum 638. The latter is splined to hub 639 which is rotatably mounted on the hub of flange 640. Free wheeler 641 is placed between hub 639 and ring 642 which is fixed in housing 643 and is biased to permit forward rotation of carrier 637 and brake drum 638 but prevents their backward rotation.

Drum 645 is notched to engage teeth 646 on housing 613 and at the other end is internally splined to mesh with sun gear 644, thus connecting sun gear 644 to turbine 602 when clutch D9 is engaged.

Drum 645 is reinforced by splined washer 647 which is welded at 648.

Output shaft 649 is splined to ring gear 634 and is retained by snap ring 650.

Flange 640 and cap 651 are fastened to housing 643 by capscrews (not shown).

Parking gear 652 and rear pump and governor drive gear 653 are splined to output shaft 649 and detent 654 is adapted to engage parking gear 652 when it is desired to hold the vehicle stationary.

Band F9 is adapted to hold brake drum 638 and carrier 637 stationary.

Operation of Fig. 9 is the same as in Fig. 8 but the gear set positions being interchanged, set A9 is located to the right or rear of gear set B9, and ring gear 630 is the input gear instead of input gear 529 in Fig. 8.

In Fig. 9, sun gear 644 has right hand helical gear teeth and input gear 630 and ring gear 634 have left hand teeth and the arrows show the direction of end thrust forces in low gear.

In second speed only gear set A9 is working and the same arrows apply to this gear set but there are no thrust forces in gear set B9. The thrust forces in sun gear 644 balance each other in low gear the same as in Fig. 8. The thrust forces of input gear 630 and ring gear 634 are likewise equal and opposite and balance each other in low gear through shoulder 657 of carrier 633, shaft 629 and snap ring 655, with relative motion present only between carrier 633 and shaft 629.

In second gear, the thrust of sun gear 644 is balanced through shaft 629 and snap ring 655 with relative motion under load present also at only one place, i. e., between sun gear 644 and shaft 629.

While a preferred embodiment of my invention has been disclosed and described above in detail, it will be understood that numerous modifications might be resorted to without departing from the scope of my invention as defined in the following claims.

I claim:

1. A variable speed transmission for an automotive vehicle comprising a housing, axially aligned power input and power output members, a pair of axially aligned planetary gear sets interposed therebetween each having a concentrically rotatable interengaging sun gear, ring gear and planetary gear carrier, means for effecting a plurality of drive ratios between said input and output members, said means including two selectively engageable clutches and a plurality of brake connections, said brake connections including a one-way brake for holding the carrier of one gear set against reverse movement only, and a two-way brake for holding said carrier of said one gear set against movement in either direction, said clutches and brake connections being adapted upon successive operation to provide a first forward reduction ratio with one of said clutches engaged and the other released wherein the ring gear of the other gear set is driven at input speed and the ring gear of said one gear set at output speed, the carrier of said one gear set being held stationary against reverse movement by said one-way brake and the other carrier rotates with the output member and wherein the two sun gears rotate together, a second forward reduction ratio with said one clutch engaged and the other released wherein free forward movement of the carrier of said one gear set is accommodated by said one-way brake and said two sun gears are held stationary, a forward direct drive ratio with both of said clutches engaged wherein both planetary sets are locked up, and a reverse reduction ratio, with said other clutch engaged and said one released wherein one of said planetary sets is ineffective to modify the drive ratio while the carrier of said one gear set is held stationary by said two-way brake, the sun gear is driven at input speed and the ring gear at output speed, said clutch connections being characterized by one clutch connection adapted to drive both sun gears at input speed in both direct drive and reverse reduction ratios.

2. A variable speed transmission for an automotive vehicle comprising a housing, axially aligned power input and power output members, a pair of axially aligned planetary gear sets interposed therebetween, each having a concentrically rotatable interengaging sun gear, ring gear and planetary gear carrier, means for effecting three progressive forward drive ratios between said input and output members, said means including two selectively gradually engageable clutches and a plurality of brake connections, including a one-way brake for one of said carriers, said clutches and said brake connections being adapted upon successive operation to provide a forward direct drive ratio with both clutch connections engaged wherein both planetary sets are locked up by simultaneously connecting said input member through one of said clutches to one of said ring gears and through the other of said clutches to both of said sun gears, said sun gears of the two sets being integral, said other ring gear and other carrier being connected to said output member and said one clutch connection being engaged in all forward speeds.

3. A variable speed transmission for an automotive vehicle comprising a housing, axially aligned power input and power output members, a pair of axially aligned planetary gear sets interposed therebetween each having a concentrically rotatable interengaging sun gear, ring gear and planetary gear carrier, means for effecting a plurality of drive ratios between said input and output members, said means including two selectively engageable clutches and a plurality of brake connections including a one-way brake connection for one of said carriers, said clutches and said brake connections being adapted upon successive operation to provide a first forward reduction ratio with a first of said clutches engaged and the second released wherein one of the ring gears is driven at input speed and said other at output speed, the carrier associated with the other ring gear is held stationary against reverse rotation by said one-way brake and the other carrier rotates with the output member and wherein the two sun gears rotate together, a second forward reduction ratio with said first clutch engaged and said second released wherein the one-way brake frees the formerly stationary carrier for forward rotation and said two sun gears are held stationary by a different brake connection, and a forward direct drive ratio with both of said clutches engaged wherein both planetary sets are locked up, said clutch and brake connections being characterized by one of said clutch connections being engaged during first and second forward reduction and direct drive ratios, the second clutch connecting said input member to both of said sun gears being engaged during direct drive ratio, the said one-way brake connection being effective only during the first forward reduction ratio, and a second brake connection being engaged only during the second forward reduction ratio.

4. A variable speed transmission for an automotive vehicle comprising a housing, axially aligned power input and power output members, a pair of axially aligned planetary gear sets interposed therebetween, each having a concentrically rotating interengaging sun gear, ring gear and planetary carrier, means for effecting three progressive forward drive ratios between said input and output members, said means including two selectively engageable friction clutches and two selectively engageable friction brake connections, including a one-way brake for one of said carriers, said clutches and said brake connections being adapted upon successive operation to provide a first forward reduction ratio with a first of said clutches engaged and the second released and the one-way brake is effective, one of the ring gears is driven at input speed and said other at output speed, the carrier associated with the other ring gear is held stationary by said one-way brake and the other carrier rotates with the output member and wherein the two sun gears rotate conjointly; a second reduction ratio with said first clutch engaged and said second released wherein said one-way brake connection for said stationary carrier is ineffective and the second brake connection is engaged to hold said sun gears stationary; and a direct drive ratio with both of said clutches engaged and both of said brake connections are released, said second clutch being adapted to connect both sun gears to the input member.

5. A variable speed transmission for an automotive vehicle comprising a housing, axially aligned power input and power output members, a pair of axially aligned planetary gear sets interposed therebetween, each having a concentrically rotatable interengaging sun gear, ring gear and planetary gear carrier, means for effecting two progressive forward ratios between said input and output members, said means including two selectively engageable clutches and a plurality of brake connections, including a one-way brake, adapted upon successive operation to provide a first forward reduction ratio with a first of said clutches engaged and the second released wherein one of the ring gears is driven at input speed and the other at output speed, the carrier associated with said other ring gear is held against reverse movement only by said one-way brake connection and the other carrier rotates at output speed, and wherein the two sun gears rotate conjointly, and a second forward reduction ratio with said first clutch remaining engaged and said second remaining released and wherein said stationary carrier is freed by said one-way brake to rotate forwardly and said sun gears are held stationary by a second of said brake connections, the second of said clutches being engageable to connect the input member to both of said sun gears while the first of said clutches is engaged and said brake connections are released to provide a direct drive.

6. A variable speed transmission for an automotive vehicle comprising a housing, axially aligned power input and power output members, a pair of axially aligned planetary gear sets interposed therebetween each having a concentrically rotatable interengaging sun gear, ring gear and planetary gear carrier, means for effecting a plurality of drive ratios between said input and output members, said means including two selectively gradually engageable clutches and a plurality of brake connections adapted upon successive operation to provide a first forward reduction ratio with a first of said clutches engaged and the second released wherein one of the ring gears is driven at input speed and the other at output speed, the carrier associated with said other ring gear is held stationary against reverse rotation only by one of said brake connections and the other carrier rotates with the output member and wherein the two sun gears rotate together, a second forward reduction ratio with said first clutch engaged and said second released wherein such stationary carrier is free to rotate forwardly and said two sun gears are held stationary by one of said brake connections, a forward direct drive ratio with both of said clutches engaged wherein both planetary sets are locked up by simultaneously connecting said input member to one of said ring gears and to both of said sun gears by said clutch connections, and a reverse reduction ratio with said first clutch released and said second engaged wherein one of said planetary sets is ineffective to modify the drive ratio while in the other gear set the carrier is held stationary against rotation by another of said brake connections, the sun gear is driven at input speed and the ring gear at output speed, said clutch connections being characterized by one clutch connection adapted to drive both sun gears at input speed in both direct drive and reverse reduction ratios.

7. A variable speed transmission for an automotive vehicle comprising a housing, axially aligned power input and power output members, a pair of axially aligned planetary gear sets interposed therebetween, each having a concentrically rotating interengaging sun gear, ring gear and planetary carrier, means for effecting three progressive forward and a reverse drive ratios between said input and output members, said means including two selectively gradually engageable friction clutches, a one-way brake, and two selectively gradually engageable friction brake connections adapted upon successive operation to provide a first forward reduction ratio with a first of said clutches engaged and the second released and said one-way brake is engaged, one of the ring gears is driven at input speed and the other at output speed, the carrier associated with said other ring gear is held stationary against only reverse rotation by said one-way brake and the other carrier rotates with the output member and wherein the two sun gears rotate conjointly; a second reduction ratio with said first clutch engaged and said second released wherein said one-way brake connection for said stationary carrier is ineffective and the second brake connection is engaged to hold said sun gears stationary, a direct drive ratio with both of said clutches engaged connecting said input member to one of said ring gears and to both of said sun gears and both of said brakes are released, and a reverse reduction ratio with said first clutch released and said second engaged second speed brake is released while the other friction brake connection is engaged to render one of said planetary sets ineffective to modify the drive ratio, while in the other gear set the carrier is held stationary against both forward and reverse rotation by said friction brake connection, the sun gear is driven at input speed and the ring gear at output speed.

8. A variable speed transmission for an automotive vehicle comprising a housing, axially aligned power input and power output members, a pair of axially aligned planetary gear sets interposed therebetween, each having a concentrically rotatable interengaging sun gear, ring gear and planetary gear carrier, means for effecting three progressive forward ratios and a reverse drive ratio between said input and output members, said means including two selectively engageable clutches, a one-way brake, and a pair of brake connections adapted upon successive operation to provide a first forward reduction ratio with a first of said clutches engaged and the second released wherein one of the ring gears is driven at input speed and the other at output speed, the carrier associated with said other ring gear is held stationary by said one-way brake and the other carrier rotates at output speed, and wherein the two sun gears rotate conjointly; a second forward reduction ratio with said first clutch engaged and said second released wherein said one-way brake is ineffective to hold said stationary carrier and said sun gears are held stationary by one of said brake connections; a forward direct drive ratio with both of said clutches engaged wherein both planetary sets are locked up; and a reverse reduction ratio with said first clutch released and said second engaged wherein one of said planetary sets is ineffective to modify the drive ratio while in the other gear set the carrier is held stationary, the sun gear is driven at input speed, the ring gear is driven at output speed, and said stationary carrier is held against rotation in either direction by the other of said brake connections.

9. A variable speed transmission for an automotive vehicle comprising a housing, axially aligned power input and power output members, a pair of axially aligned planetary gear sets interposed therebetween each having a concentrically rotatable interengaging sun gear, ring gear and planetary gear carrier, means for effecting a plurality of drive ratios between said input and output members, said means including two selectively engageable clutches and a plurality of brake connections adapted upon successive operation to provide a first forward reduction ratio with one of said clutches engaged and the other released wherein one of the ring gears is driven at input speed and the other at output speed, the carrier associated with the output ring gear is held stationary and the other carrier rotates with the output member and wherein the two sun gears rotate together, a second forward reduction ratio with said one clutch engaged and the other released wherein said carrier associated with the output ring gear is released and said two sun gears are held stationary, a forward direct drive ratio with both of said clutches engaged wherein both planetary sets are locked up, and a reverse reduction ratio with said other clutch engaged and said one released wherein one of said planetary sets is ineffective to modify the drive ratio while in the other the carrier is held stationary, the sun gear is driven at input speed and the ring gear at output speed, said clutches being characterized by one clutch adapted to drive both sun gears at input speed in both direct drive and reverse reduction ratios.

10. The combination set forth in claim 9, in which both of said clutches include driving and driven discs, the driving discs of both clutches being rotated by a single member.

11. In the combination set forth in claim 9, one of said clutches having a clutch housing which acts as a brake drum for holding the sun gears stationary said clutch housing being rotatably mounted on stationary portion of the transmission housing structure.

12. A variable speed transmission for an automotive vehicle comprising a housing, axially aligned power input and power output members, a pair of axially aligned planetary gears sets interposed therebetween, each having a concentrically rotatable interengaging sun gear, ring gear and planetary gear carrier, means for effecting three progressive forward and a reverse drive ratio between said input and output members, said means including two selectively gradually engageable clutches and a plurality of brake connections adapted upon successive operation to provide a forward direct drive ratio with both clutches engaged wherein both planetary sets are locked up by simultaneously connecting said input member to one of said ring gears and to both of said sun gears by said clutches, and a reverse reduction ratio with one of said clutches engaged and the other released wherein one of said planetary sets is without effect in modifying the drive ratio while in the other the carrier is held stationary, the sun gear is driven at input speed and the ring gear at output speed, said sun gears of the two sets being integral, said other clutch being engaged in all forward speeds.

13. A variable speed transmission for an automotive vehicle comprising a housing, axially aligned power input and power output members, a pair of axially aligned planetary gear sets interposed therebetween each having a concentrically rotatable interengaging sun gear, ring gear and planetary gear carrier, means for effecting a plurality of drive ratios between said input and output members, said means including two selectively engageable clutches and a plurality of brake connections adapted upon successive operation to provide a first forward reduction ratio with a first of said clutches engaged and the second released wherein one of the ring gears is driven at input speed and the other at output speed, the carrier associated with the output ring gear is held stationary and the other carrier rotates with the output member and wherein the two sun gears rotate together, a second forward reduction ratio with said first clutch engaged and said second released wherein such stationary carrier is released and said two sun gears are held stationary, a forward direct drive ratio with both of said clutches engaged wherein both planetary sets are locked up, and a reverse reduction ratio with said first clutch released and said second engaged wherein one of said planetary sets is without effect in modifying the drive ratio while in the other the carrier is held stationary, the sun gear is driven at input speed and the ring gear at output speed, said clutches and brake connections being characterized by one of said clutches being engaged during first and second forward reduction and direct drive ratios, the second clutch being engaged during direct drive and reverse reduction ratios, one of said brake connections being engaged during the first forward reduction and the reverse reduction ratios and a second brake connection being engaged during the second forward reduction ratio.

14. The combination set forth in claim 13 in which the clutch that drives said ring gear at input speed is located between the other clutch and said ring gear.

15. The combination set forth in claim 13 in which the clutch that drives the two sun gears at input speed is connected to said sun gears by a member enclosing the other clutch.

16. In the combination set forth in claim 13, a brake drum connected to said carrier associated with the output ring gear on one side of said output ring gear, means on the other side of said output ring gear supporting the brake drum on said housing.

17. A variable speed transmission for an automotive vehicle comprising a housing, axially aligned power input and power output members, a pair of axially aligned planetary gear sets interposed therebetween, each having a concentrically rotating interengaging sun gear, ring gear and planetary carrier, means for effecting three progressive forward and a reverse drive ratios between said input and output members, said means including two selectively engageable friction clutches and two selectively engageable friction brake connections adapted upon successive operation to provide a first forward reduction ratio with a first of said clutches engaged and the second released and one of the brake connections engaged, wherein one of the ring gears is driven at input speed and the other at output speed, the carrier associated with the output ring gear is held stationary and the other carrier rotates with the output member and wherein the two sun gears rotate conjointly; a second reduction ratio with said first clutch engaged and said second clutch released wherein said engaged brake connection for said stationary carrier is released and the second brake connection is engaged to hold said sun gears stationary; a direct drive ratio wherein both of said clutches are engaged and both of said brakes are released, and a reverse reduction ratio wherein said first speed clutch and second speed brake connection are released while the other clutch and brake connection are engaged to render one of said planetary sets ineffective to modify the drive ratio, while in the other the carrier is held stationary, the sun gear is driven at input speed and the ring gear at output speed.

18. A variable speed transmission for an automotive vehicle comprising a housing, axially aligned power input and power output members, a pair of axially aligned planetary gear sets interposed therebetween, each having a concentrically rotatable interengaging sun gear, ring gear and planetary gear carrier, means for effecting three progressive forward ratios and a reverse drive ratio between said input and output members, said means including two selectively engageable clutches and a plurality of brake connections adapted upon successive operation to provide a first forward reduction ratio with a first of said clutches engaged and the second released wherein one of the ring gears is driven at input speed and the other at output speed, the carrier associated with the output ring gear is held stationary and the other carrier rotates at output speed, and wherein the two sun gears rotate conjointly; a second forward reduction ratio with said first clutch engaged and said second released wherein said stationary carrier is released and said sun gears are held stationary; a forward direct drive ratio with both of said clutches engaged wherein both planetary sets are locked up; and a reverse reduction ratio with said first clutch released and said second engaged wherein one of said planetary sets is ineffective to modify the drive ratio while in the other the carrier is held stationary, the sun gear is driven at input speed and the ring gear at output speed.

19. In the combination set forth in claim 18, a brake drum connected to said carrier associated with the output ring gear on one side of said output ring gear, means on the other side of said output ring gear supporting the brake drum on the stationary housing structure, and overrunning means biased to prevent backward rotation of said brake drum.

20. The combination set forth in claim 18 including overrunning means biased to prevent backward rotation of said carrier associated with the output ring gear.

21. A variable speed transmission for an automotive vehicle comprising a housing, axially aligned power input and power output members, a pair of axially aligned planetary gear sets interposed therebetween each having a concentrically rotatable interengaging sun gear, ring gear and planetary gear carrier, means for effecting a plurality of drive ratios between said input and output members, said means including two selectively gradually engageable clutches and a plurality of brake connections adapted upon successive operation to provide a first forward reduction ratio with a first of said clutches engaged and the second released wherein one of the ring gears is driven at input speed and the other at output speed, the carrier associated with the output ring gear is held stationary and the other carrier rotates with the output member and wherein the two sun gears rotate together, a second forward reduction ratio with said first clutch engaged and said second released wherein such stationary carrier is released and said two sun gears are held stationary, a forward direct drive ratio with both of said clutches engaged wherein both planetary sets are locked up by simultaneously connecting said input member to one of said ring gears and to both of said sun gears by said clutch connections, and a reverse reduction ratio with said first clutch released and said second engaged wherein one of said planetary sets is ineffective to modify the drive ratio while in the other the carrier is held stationary, the sun gear is driven at input speed and the ring gear at output speed, said clutches being characterized by one clutch adapted to drive both sun gears at input speed in both direct drive and reverse reduction ratios.

22. A variable speed transmission for an automotive vehicle comprising a housing, axially aligned power input and power output members, a pair of axially aligned planetary gear sets interposed therebetween each having a concentrically rotatable interengaging sun gear, ring gear and planetary gear carrier, means for effecting a plurality of drive ratios between said input and output members, said means including two selectively gradually engageable clutches and a plurality of brake connections adapted upon successive operation to provide a first forward reduction ratio with a first of said clutches engaged and the second released wherein one of the ring gears is driven at input speed and the other at output speed, the carrier associated with the output ring gear is held stationary and the other carrier rotates with the output member and wherein the two sun gears rotate together, a second forward reduction ratio with said first clutch engaged and said second released wherein such stationary carrier is released and said two sun gears are held stationary, a forward direct drive ratio with both of said clutches engaged wherein both planetary sets are locked up by simultaneously connecting said input member to one of said ring gears and to both of said sun gears by said clutches, and a reverse reduction ratio with said first clutch released and said second engaged wherein one of said planetary sets is without effect in modifying the drive ratio while in the other the carrier is held stationary, the sun gear is driven at input speed and the ring gear at output speed, said clutches and brake connections being characterized by one of said clutches being engaged during first and second forward reduction and direct drive ratios, the second clutch being engaged during direct drive and reverse reduction ratios, one of said brake connections being engaged during the first forward reduction and the reverse reduction ratios and a second brake connection being engaged during the second forward reduction ratio.

23. A variable speed transmission for an automotive vehicle comprising a housing, axially aligned power input and power output members, a pair of axially aligned planetary gear sets interposed therebetween, each having a concentrically rotating interengaging sun gear, ring gear and planetary carrier, means for effecting three progressive forward and a reverse drive ratios between said input and output members, said means including two selectively gradually engageable friction clutches and two selectively gradually engageable friction brake connections adapted upon successive operation to provide a first forward reduction ratio with a first of said clutches engaged and the second released wherein one each of said clutches and brake connections is engaged, one of the ring gears is driven at input speed and the other at output speed, the carrier associated with the output ring is held stationary and the other carrier rotates with the output member and wherein the two sun gears rotate conjointly; a second reduction ratio with said first clutch engaged and said second released wherein said engaged brake connection for said stationary carrier is released and the second brake connection is engaged to hold said sun gears stationary, a direct drive ratio wherein both of said clutches are engaged simultaneously connecting said input member to one of said ring gears and to both of said sun gears and both of said brakes are released, and a reverse reduction ratio wherein said first speed clutch and second speed brake connection are released while the other clutch and brake connection are engaged to render one of said planetary sets ineffective to modify the drive ratio, while in the other the carrier is held stationary, the sun gear is driven at input speed and the ring gear at output speed.

24. A variable speed transmission for an automotive vehicle comprising a housing, axially aligned power input and power output members, a pair of axially aligned planetary gear sets interposed therebetween, each having a concentrically rotatable interengaging sun gear, ring gear and planetary gear carrier, means for effecting three progressive forward ratios and a reverse drive ratio between said input and output members, said means including two selectively gradually engageable clutches and a plurality of gradually engageable brake connections adapted upon successive operation to provide a first forward reduction ratio with a first of said clutches engaged and the second released wherein one of the ring gears is driven at input speed and the other at output speed, the carrier associated with the output ring gear is held stationary and the other carrier rotates at output speed, and wherein the two sun gears rotate conjointly; a second forward reduction ratio with said first clutch engaged and said second released wherein said stationary carrier is released and said sun gears are held stationary; a forward direct drive ratio with both of said clutches engaged wherein both planetary sets are locked up by simultaneously connecting said input member to one of said ring gears and to both of said sun gears by said clutches; and a reverse reduction ratio with said first clutch released and said second engaged wherein one of said planetary sets is ineffective to modify the drive ratio while in the other the carrier is held stationary, the sun gear is driven at input speed and the ring gear at output speed.

25. A variable speed transmission comprising two axially aligned planetary gear sets relatively disposed in forwardmost and rearwardmost positions each having a sun gear, a ring gear, planet gears meshing with said sun and ring gears and a planet gear carrier, input and output shafts respectively extending forwardly and rearwardly beyond and axially aligned with said gear sets, clutch means for connecting the input shaft to the ring gear of the rearwardmost gear set, brake means for holding the carrier of the forwardmost gear set, the sun gears being connected together, a radially outward extension of the carrier of the rearwardmost gear set between the respective gear sets with means for connecting said extension over the rearwardmost ring gear to the output shaft, the ring gear of the forwardmost gear set also being connected to the output shaft, and an end thrust bearing between said rearwardmost carrier and ring gear.

26. The combination set forth in claim 25 and clutch means for connecting the input shaft to the sun gears for obtaining a reverse reduction when the last named clutch means is engaged and the brake means is applied.

27. A variable speed transmission comprising two axially aligned planetary gear sets relatively disposed in forwardmost and rearwardmost positions each having a sun gear, a ring gear, planet gears meshing with said sun and ring gears and a planet gear carrier, input and output shafts respectively extending forwardly and rearwardly beyond the outer ends of and axially aligned with said gear sets, clutch means for connecting the input shaft to the ring gear of the rearwardmost gear set, brake means for holding the carrier of the forwardmost gear set, the sun gears being connected together, an outward extension of the carrier of the rearwardmost gear set between the respective gear sets being connected to the ring gear of the forwardmost gear set and means extending radially outward over the ring gear of the rearwardmost set for connecting said forwardmost ring gear and rearwardmost carrier to the output shaft, and end thrust bearing means subjecting said rearwardmost carrier to axial end thrust loads from the ring gear of each gear set.

28. The combination set forth in claim 27 and clutch means for connecting the input shaft to the sun gears for obtaining a reverse reduction when the last named clutch means is engaged and the brake means is applied.

29. A variable speed transmission comprising two axially aligned planetary gear sets relatively disposed in forwardmost and rearwardmost positions each having a sun gear, a ring gear, planet gears meshing with said sun and ring gears and a planet gear carrier, input and output shafts respectively extending forwardly and rearwardly beyond the outer ends of and axially aligned with said gear sets, clutch means for connecting the input shaft to the ring gear of the rearwardmost gear set, brake means for holding the carrier of the forwardmost gear set, the sun gears being connected together, the carrier of the rearwardmost gear set and the ring gear of the forwardmost gear set being connected to the output shaft, an end thrust bearing engaged by the carrier and ring gear of the rearwardmost gear set, and a second end thrust bearing engaged by the sun gear and the ring gear of the rearwardmost set.

30. The combination set forth in claim 29, and an end thrust bearing between the ring gears of each set.

31. A multi-speed transmission comprising two axially aligned planetary gear sets relatively disposed in forwardmost and rearwardmost positions each having a helical sun gear, a helical ring gear, helical planet gears meshing with said sun and ring gears and a planet gear carrier, input and output shafts respectively extending forwardly beyond the outer ends and rearwardly of and axially aligned with said gear sets, clutch means for connecting the input shaft to the ring gear of the rearwardmost gear set, brake means for holding the carrier of the forwardmost gear set, a driving connection between the sun gears of both sets, a driving connection between the output shaft, the carrier of the rearwardmost gear set and the ring gear of the forwardmost gear set, means including a single thrust bearing for balancing the end thrust of the ring gears against each other when said clutch means is engaged and said brake means is applied to produce a reduction through the transmission, second brake means for holding the sun gears against rotation, and means including a single thrust bearing for balancing the end thrust of the sun gears against that of the ring gear of the rearwardmost gear when said clutch means is engaged and said second brake means is applied to produce a reduction through the transmission.

32. The combination as set forth in claim 9 including a one-way brake connection for holding the carrier associated with the output ring against backward rotation.

33. The combination set forth in claim 13 including a one-way brake connection for holding the carrier associated with the output ring against backward rotation.

34. The combination set forth in claim 17 and a one-way brake connection for holding the carrier associated with the output ring against backward rotation.

35. The combination set forth in claim 18 including a one-way brake connection for holding the carrier associated with the output ring against backward rotation.

36. The combination set forth in claim 21 including a one-way brake connection for holding the carrier associated with the output ring against backward rotation.

37. The combination set forth in claim 22 including a one-way brake connection for holding the carrier associated with the output ring against backward rotation.

38. The combination set forth in claim 23 and a one-way brake connection for holding the carrier associated with the output ring against backward rotation.

39. The combination set forth in claim 24 and a one-way brake connection for holding the carrier associated with the output ring against backward rotation.

40. The combination set forth in claim 9, in which the input and output shafts are adjacent with no intervening shaft.

41. The combination set forth in claim 9 wherein in said first forward reduction ratio the carrier associated with the output ring gear is held stationary against backward rotation only and is released for forward rotation when said two sun gears are held stationary for said second forward reduction ratio.

42. The combination set forth in claim 41 including a shaft intermediate and axially aligned with said power input and power output members, said input member extending forwardly from said intermediate shaft, said output member extending rearwardly from said intermediate shaft, said gear sets encircling said intermediate shaft, the ring gear of the rearwardmost gear set being driven at input speed in said first forward reduction ratio, and the carrier of the forwardmost gear set being held stationary in reverse reduction ratio.

43. The combination set forth in claim 41 wherein said power input and power output members extend respectively away from each other in a forwardly and rearwardly direction, the ring gear of the forwardmost gear set being driven at input speed in said first forward reduction ratio, and the carrier of the rearwardmost gear set being held stationary in said reverse reduction ratio.

44. The combination set forth in claim 9 wherein said power input and power output members extend respectively away from each other in a forwardly and rearwardly direction, the sun gears of the two sets being drivingly interconnected, the ring gear of the rearwardmost gear set and the carrier of the forwardmost gear set being drivingly connected to the output member, said one clutch being engageable to connect the input member to the ring gear of the forwardmost gear set, said other clutch being engageable to connect the input member to both sun gears, one of said brake connections being engageable to hold the carrier of the rearwardmost gear set, another of said brake connections being engageable to hold both sun gears.

45. The combination set forth in claim 44 wherein said other clutch has a drum portion fixed thereto that encircles said forwardmost gear set and is drivingly connected to said sun gears.

46. The combination set forth in claim 44 wherein said other clutch has a brake drum portion that encircles said one clutch and said forwardmost gear set and is drivingly connected to said sun gears.

47. The combination set forth in claim 9, including a shaft intermediate and axially aligned with said power input and power output members, said input member extending forwardly from said intermediate shaft, the sun gears of the two sets being drivingly interconnected, the ring gear of the forwardmost gear set and the carrier of the rearwardmost gear set being drivingly connected to the output member, said one clutch being engageable to connect the input member to the ring gear of the rearwardmost gear set, said other clutch being engageable to connect the input member to both sun gears, one of said brake connections being engageable to hold the carrier of the forwardmost gear set, another of said brake connections being engageable to hold both sun gears.

48. The combination set forth in claim 47 wherein said brake connection engageable to hold the carrier is a one-way brake device preventing reverse rotation.

49. The combination set forth in claim 9 wherein at least one of said brake connections is a one-way brake device.

References Cited in the file of this patent

UNITED STATES PATENTS

| | | |
|---|---|---|
| 2,518,824 | Simpson | Aug. 15, 1950 |
| 2,578,450 | Pollard | Dec. 11, 1951 |
| 2,605,652 | Kelbel | Aug. 5, 1952 |
| 2,689,029 | McFarland | Sept. 14, 1954 |
| 2,715,343 | Youngren et al. | Aug. 16, 1955 |
| 2,726,557 | Ackerman | Dec. 13, 1955 |

FOREIGN PATENTS

| | | |
|---|---|---|
| 1,069,080 | France | July 5, 1954 |

UNITED STATES PATENT OFFICE

CERTIFICATE OF CORRECTION

Patent No. 2,856,794                                            October 21, 1958

Howard W. Simpson

It is hereby certified that error appears in the printed specification of the above numbered patent requiring correction and that the said Letters Patent should read as corrected below.

Column 2, line 67, strike out "adjusted"; column 4, line 46, for "and C3" read -- and clutch C3 --; same line, for "the", first occurrence, read -- they --; column 7, line 40, before "in" insert -- is mounted --; column 14, line 19, after "engaged" insert -- said --; column 15, line 3, after "engaged" insert -- and said brake connections released --; column 19, line 55, strike out "and rearwardly" and insert the same after "forwardly", same line.

Signed and sealed this 10th day of February 1959.

(SEAL)
Attest:

KARL H. AXLINE                                          ROBERT C. WATSON
Attesting Officer                                      Commissioner of Patents